(No Model.)

L. A. SHEAD & H. P. FAIRFIELD.
ORE SEPARATOR.

No. 296,075. Patented Apr. 1, 1884.

Witnesses.
John P. C. Brinkerh
Fred A. Powell

Inventor.
Hadley P. Fairfield and
Louis A. Shead.
by Crosby Gregory attys.

UNITED STATES PATENT OFFICE.

LOUIS A. SHEAD, OF ALAMEDA, CAL., AND HADLEY P. FAIRFIELD, OF WEST MEDFORD, MASS., ASSIGNORS TO GORDON McKAY, TRUSTEE.

ORE-SEPARATOR.

SPECIFICATION forming part of Letters Patent No. 296,075, dated April 1, 1884.

Application filed May 22, 1883. (No model.)

*To all whom it may concern:*

Be it known that we, LOUIS A. SHEAD, of Alameda, county of Alameda, State of California, and HADLEY P. FAIRFIELD, of West Medford, county of Middlesex, State of Massachusetts, have invented an Improvement in Ore-Separators, of which the following description, in connection with the accompanying drawings, is a specification, like letters on the drawings representing like parts.

Our invention relates to an ore-separator of that class in which the materials to be separated are acted upon by a stream passing through a sluice with narrow transverse slits in its bottom, substantially as described in a joint application filed by us May 10, 1883, Serial No. 94,521, in which the operation of the said slits is fully explained. In the said application the said slits were shown as formed between the edges of movable plates constituting the bottom of the sluice, the said plates being made movable for the purpose of dislodging particles that become wedged therein, and thus keeping the slits clean. In the present invention the portion of the bottom provided with the slits has no movement for the purpose of clearing the slits.

Figure 2:
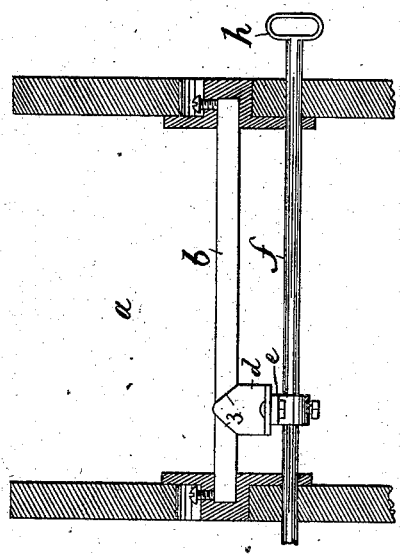
Figure 1:
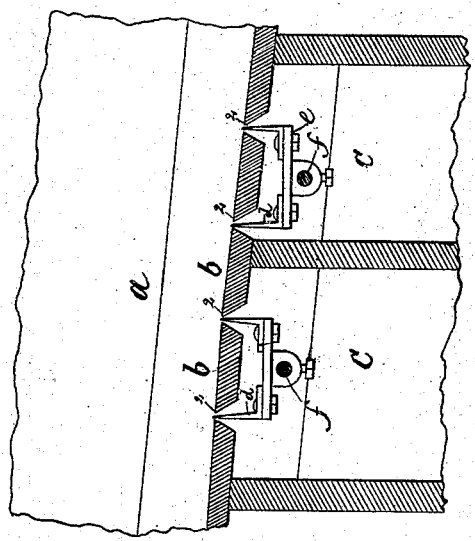

In the accompanying drawings, Figure 1 is a partial longitudinal section of a portion of an ore-separating apparatus embodying this invention, and Fig. 2 a transverse section thereof.

The sluice $a$ has its bottom $b$ provided with narrow transverse slits 2, operating to separate the different materials in the manner described in our former application referred to, the heavier materials dropping down through the said slits into a receiving-chamber, C, under the bottom of the sluice. In order to prevent the slits from being clogged by particles too large to pass through becoming wedged therein, the apparatus is provided with clearing devices $d$, placed between the edges of the plates forming the bottom $b$ of the sluice, and extending up into the said slits 2, the sides of the said clearing devices $d$ being inclined, as shown at 3, Fig. 2, so that when they are moved longitudinally along the slits the said edges 3, engaging the under sides of particles lodged in the said slits, will raise the said particles up from the said slits, thereby detaching them and forcing them back in the direction from which they entered without producing any pressure or abrasive action between the particles and the side of the slit.

The clearing devices $d$ are herein shown as mounted on cross-heads $e$, which are carried by rods $f$, shown in this instance as provided with handles $h$, by means of which they may be moved back and forth across the sluice, the said clearing devices thus moving longitudinally through the slits. If desired, the said clearing devices may be operated automatically by any suitable mechanism actuated by a wheel turned by the current passing through the sluice, or by any other suitable motor. By placing the said clearing devices and their actuating mechanism below the bottom $b$ of the sluice, it will be seen that they do not obstruct the flow of the stream in the said sluice, and do not interfere with the process of separation going on at the slits, as would be the case if they passed down into the slits from above the bottom of the sluice; and the said devices, furthermore, are themselves protected from the action of the stream and the rocks and other material carried by it.

We do not herein broadly claim a sluice having a transverse slit through its bottom, combined with a clearing device below the said slit, and supporting and operating mechanism for the said clearing device outside of and removed from the action of the stream passing through the sluice, the said clearing device acting on substantially the whole length of the slit; or the combination of the sluice having a transverse slit through its bottom with a clearing device and means to move the said clearing device longitudinally in the said slit, the said clearing device having inclined edges, whereby the particles are lifted out of the said slits, the same forming the subject-matter of another application filed by us December 17, 1883, and having Serial No. 114,782.

We claim—

1. The combination, with a sluice having a transverse slit through its bottom, of the horizontally-movable clearing device and support therefor, arranged wholly below the bottom of the sluice, and means to operate the clearing device in the slit, whereby the regularity of the stream remains undisturbed, substantially as set forth.

2. The combination, with a sluice having a transverse slit through its bottom, of the clearing device having inclined edges movable longitudinally in the said slit, the support for said clearing device, arranged wholly below the bottom of the sluice, and means to operate the said clearing device, whereby intruding particles are lifted out of the slits and the action of the stream left undisturbed.

In testimony whereof we have signed our names to this specification in the presence of two subscribing witnesses.

LOUIS A. SHEAD.
HADLEY P. FAIRFIELD.

Witnesses to signature of Louis A. Shead:
KATE M. SMITH,
N. W. PALMER.

Witnesses to signature of H. P. Fairfield:
JOS. P. LIVERMORE,
G. W. GREGORY.